United States Patent [19]

Kadowaki

[11] Patent Number: 5,526,890
[45] Date of Patent: Jun. 18, 1996

[54] AUTOMATIC CARRIER CAPABLE OF SMOOTHLY CHANGING DIRECTION OF MOTION

[75] Inventor: Yoshimi Kadowaki, Yamagata, Japan

[73] Assignee: NEC Corporation, Tokyo, Japan

[21] Appl. No.: 392,342

[22] Filed: Feb. 22, 1995

[30] Foreign Application Priority Data

Feb. 22, 1994 [JP] Japan .................................. 6-022976

[51] Int. Cl.⁶ .................................................. B62D 61/12
[52] U.S. Cl. ............................ 180/8.3; 180/238; 180/22; 180/209
[58] Field of Search ............................... 180/8.1, 8.3, 7.1, 180/237, 238, 21, 22, 209

[56] References Cited

U.S. PATENT DOCUMENTS 5,199,524  4/1993  Ivancic ..................... 180/237
5,219,412  6/1993  Kubo ........................ 180/246
5,456,332  10/1995 Borenstein ............... 180/8.2 X

FOREIGN PATENT DOCUMENTS 4-310403  11/1992  Japan .
5-162620   6/1993  Japan ..................... 180/8.3

Primary Examiner—Brian L. Johnson
Assistant Examiner—F. Zeender
Attorney, Agent, or Firm—Young & Thompson

[57] ABSTRACT

In an automatic carrier having a body and a wheel base rotatably mounted on the body, a driving wheel is fixed to the body and a driven wheel is fixed to the wheel base. The direction of the driven wheel can be changed. A lifting mechanism is provided to lift the wheel base, i.e., the driven wheel.

18 Claims, 7 Drawing Sheets

AUTOMATIC CARRIER CAPABLE OF SMOOTHLY CHANGING DIRECTION OF MOTION

BACKGROUND OF THE INVENTION

1. Field of the Invention

The present invention relates to an unmanned or automatic carrier suitably used for carrying semiconductor wafers or the like.

2. Description of the Related Art

Recently, in factories for manufacturing semiconductor devices, manufacturing equipment has become automated, and simultaneously, carriers for carrying the semiconductor devices from one manufacturing equipment to another manufacturing equipment have been automated, i.e., unmanned.

A first prior art automatic carrier includes a body, a driving wheel mounted at a central portion of the body, and driven wheels mounted at front and back sides of the body. In this case, each of the driven wheels is formed by a caster whose direction of motion can smoothly follow the direction of the carrier.

In the first prior art automatic carrier, however, when the carrier is expected to reverse its direction of motion, the casters fluctuate greatly so as to vibrate the entire carrier. As a result, semiconductor wafers or the like mounted on the carrier may be broken. Also, when the carrier is heavy, the pivoting movement of the casters may damage guide tapes and position detection marks adhered to the ground.

In order to overcome the above-mentioned defects of the first prior art automatic carrier, a second prior art automatic carrier has suggested that the casters be mounted via direct acting guides and direct acting rails to the body (see JP-A-HEI4-310403). This will be explained later in detail.

In the second prior art automatic carrier, however, when the carrier is expected to turn by changing its direction of motion over a large angle such as 90°, the impact of the direct acting guides against the stoppers of the direct acting rails becomes large, so that the entire carrier is greatly vibrated. As a result, semiconductor wafers or the like mounted on the carrier may be broken. In addition, the sliding movement of the direct acting rails along the direct acting guides invites mechanical friction and looseness therebetween, thus vibrating the entire carrier.

SUMMARY OF THE INVENTION

It is an object of the present invention to provide an automatic carrier which can smoothy change its direction of motion at any angle.

According to the present invention, in an automatic carrier having a body and a wheel base rotatably mounted on the body, a driving wheel is fixed to the body and a driven wheel is fixed to the wheel base. The direction of the driven wheel can be changed. A lifting mechanism is provided to lift the wheel base, i.e., the driven wheel. Thus, when the carrier is expected to change its direction of motion, the carrier is stopped and, after that, the driven wheel is lifted up by the lifting mechanism. Then, the direction of the driven wheel is changed, and after that, the driven wheel is lowered down by the lifting mechanism. Then, the carrier is again moved.

BRIEF DESCRIPTION OF THE DRAWINGS

The present invention will be more clearly understood from the description as set forth below, as compared with the prior art, with reference to the accompanying drawings, wherein.

DESCRIPTION OF THE PREFERRED EMBODIMENTS

Before the description of the preferred embodiments, a prior art automatic carrier will be explained with reference to FIG. 1 (see: JP-A-HEI4-310403).

Figure 1:
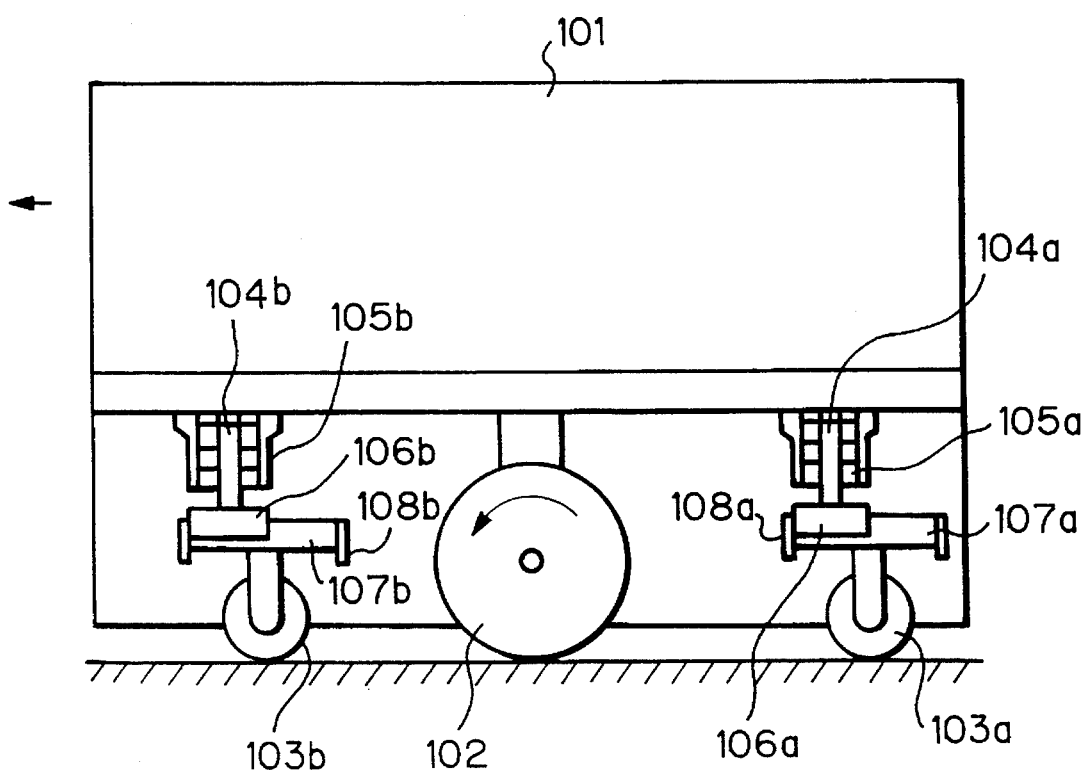
FIG. 1 is a side view illustrating a prior art automatic carrier.

In FIG. 1, reference numeral 101 designates a body having a driving wheel 102 mounted at the center portion thereof. Also, driven wheels 103a and 103b formed by casters are mounted at front and back portions, respectively, of the body 101. In this case, the driven wheels 103a and 103b are mounted via sliding mechanisms to the body 101. That is, each of the sliding mechanism is constructed by a pivot 104a (104b) fitted into a bearing 105a (105b) fixed to the body 101, a direct acting guide 106a (106b) fixed to the pivot 104a (104b), and a direct acting rail 107a (107b) fixed to the driven wheel 103a (103b). Also, stoppers 108a and 108b are provided at ends of the direct acting rails 107a and 107b.

In a state as illustrated in FIG. 1, the carrier is moving to the left side as indicated by arrows. In this state, it is assumed that the carrier is expected to reverse its direction of motion, i.e., the carrier is expected to move to the right side. At this time, the direct acting rails 107a and 107b slide through the direct acting guides 106a and 106b, respectively. In this case, the traverse motion of the driven wheels 103a and 103b is suppressed.

In the automatic carrier as illustrated in FIG. 1, however, when the carrier is expected to change its direction of motion at a large angle such as 90°, the impact of the direct acting guides 106a and 106b against the stoppers 108a and 108b of the direct acting rails 107a and 107b becomes large, so that the entire carrier is greatly vibrated. As a result, semiconductor wafers or the like mounted on the carrier may be broken. In addition, the sliding movement of the direct acting rails 107a and 10b along the direct acting guides 106a and 106b invites mechanical friction and looseness therebetween, thus vibrating the entire carrier.

Figure 2:
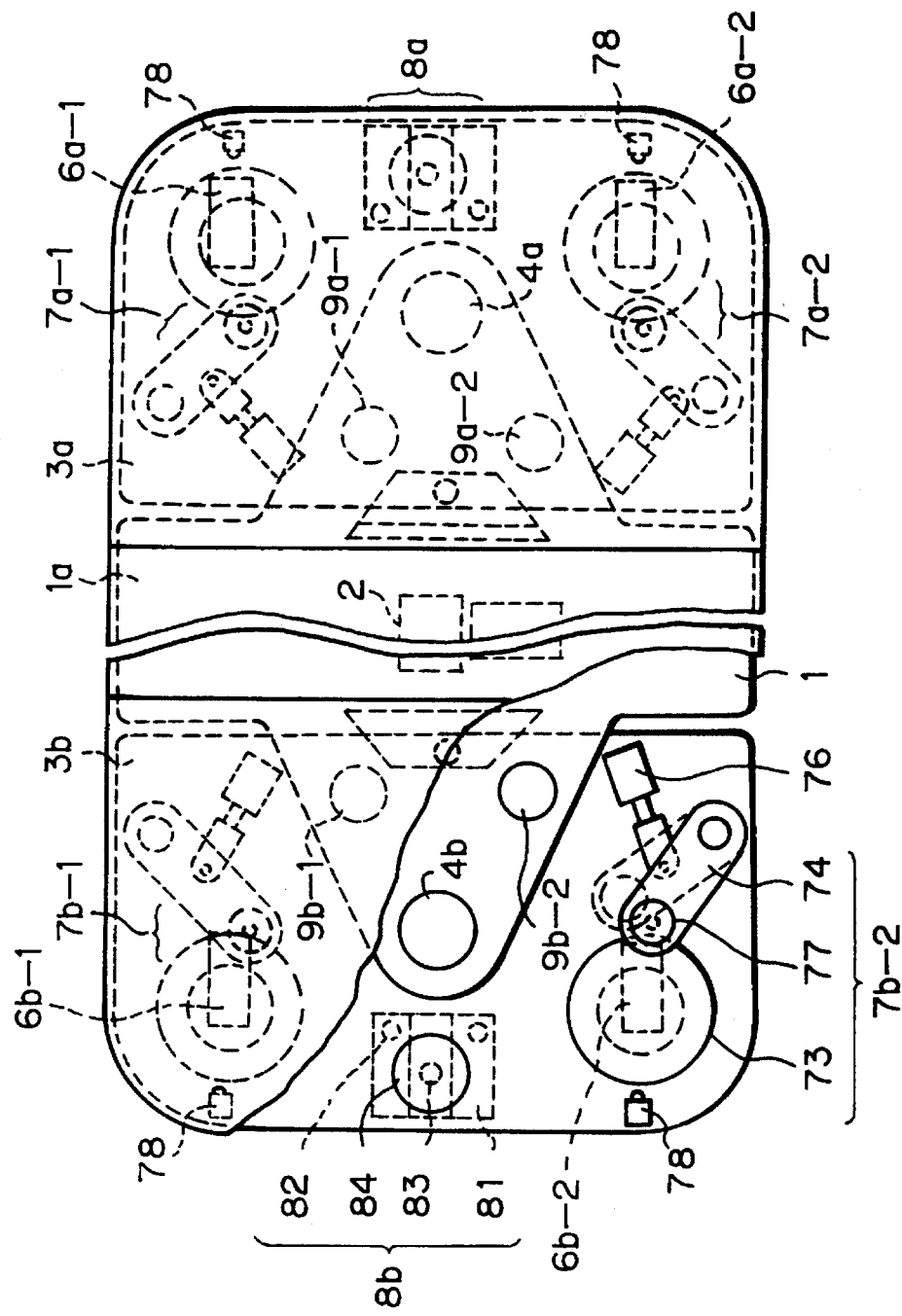
FIG. 2 is a partly-cut plan view illustrating a first embodiment of the automatic carrier according to the present invention.
Figure 3:
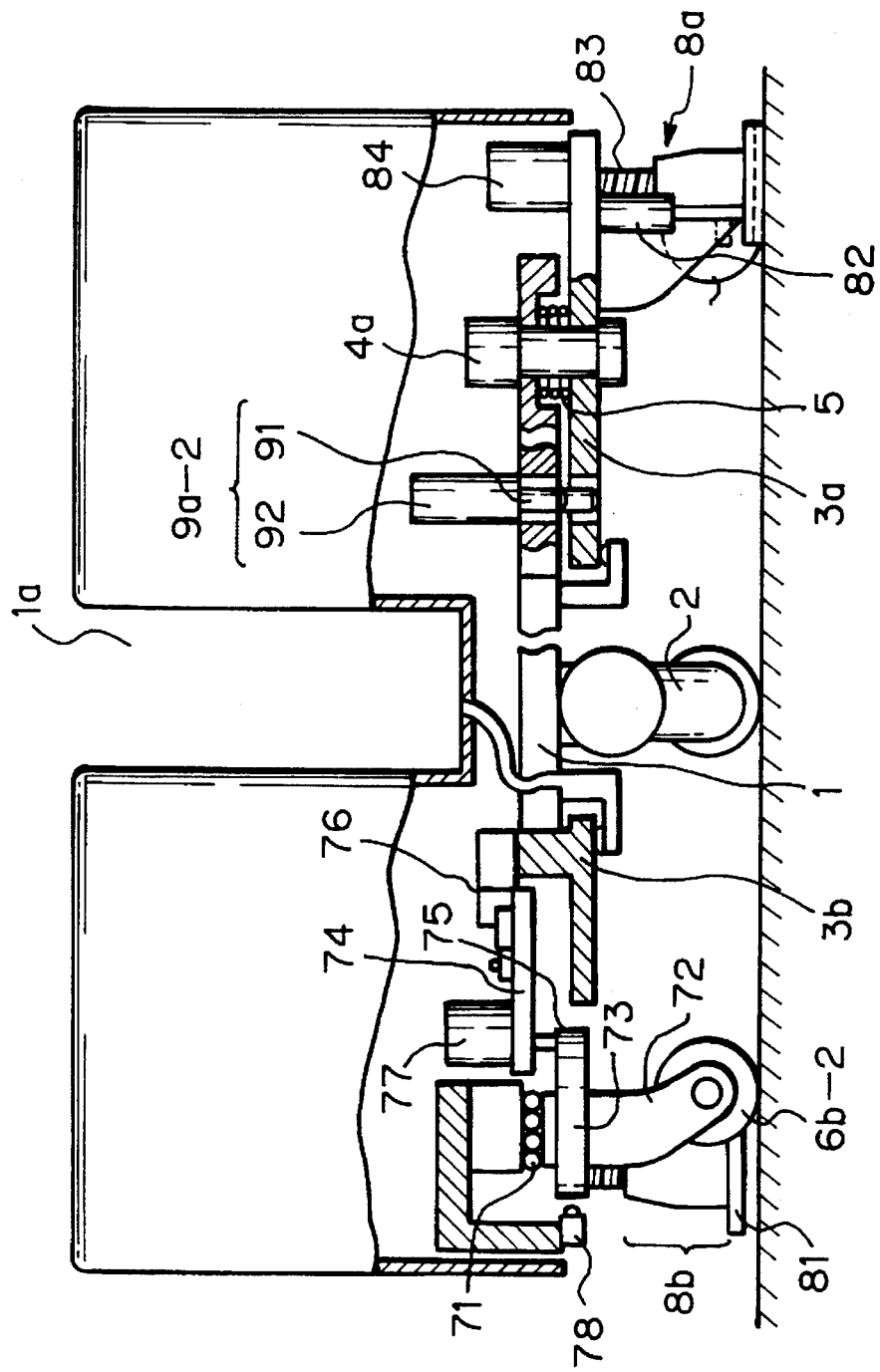
FIG. 3 is a partly-cut side view of the carrier of FIG. 2.

In FIGS. 2 and 3, which illustrate a first embodiment of the present invention, reference numeral 1 designates a body having a deck 1a for mounting semiconductor wafers or the like. A driving wheel 2 is fixed at a substantial center of the body 1.

A wheel base 3a is rotatably mounted at a front portion of the body 1 by a pivot pin 4a. In this case, the pivot pin 4a is inserted into a damper such as a spring 5 between the body 1 and the wheel base 3a, to absorb vibration of the wheel base 3a due to the roughness of the ground. Similarly, a wheel base 3b is rotatably mounted at a back portion of the body 1 by a pivot pin 4b. Also, in this case, the pivot pin 4b is inserted into a damper such as a spring (not shown) between the body 1 and the wheel base 3b, to absorb vibration of the wheel base 3b due to the roughness of the ground.

Also, mounted on the wheel base 3a are a pair of driven wheels such as casters 6a-1 and 6a-2 whose angle can be changed by angle changing mechanisms 7a-1 and 7a-2, respectively. Similarly, also, mounted on the wheel base 3b are a pair of driver wheels such as casters 6b-1 and 6b-2 whose angles can be changed by angle changing mechanisms 7b-1 and 7b-2, respectively.

Each of the angle changing mechanisms, such as 7b-2, is formed by a bearing 71 mounted on the wheel base 3a, a pivot 72 coupled between the wheel base 3a (bearing 71) and the caster 7b-2, a ring gear 73 fixed to the pivot 72, an arm 74 having a pinion 75 on an end thereof, a solenoid 76 for moving the arm 74, a motor 77 for driving the pinion 75, and an angle detector 78.

In a straight rubbing state, the pinion 75 is retracted by the solenoid 76, so that the pivot 72 can freely rotate on the bearing 71. In a curve running state, the pinion 75 is fitted into the ring gear 73 by the solenoid 76. Then, the pivot 72 is rotated by the motor 77, so that the protrusions of the ring gear 73 are counted by the angle detector 78, thus adjusting the direction of motion of the casters.

The directions of the casters 6a-1 and 6a-2 are controlled individually and independently by the angle changing mechanisms 7a-1 and 7a-2, respectively. That is, in a curve running state, the angle of one of the casters 6a-1 and 6a-2 on an inner side is made larger than the angle of the other on an outer side, to prevent traverse sliding of the casters 6a-1 and 6a-2. This is called an Ackermann system in automobiles. Therefore, when the automobile technology is applied to this carrier, the two angle changing mechanisms 7a-1 and 7a-2 can be driven by a single motor.

Similarly, the directions of the casters 6b-1 and 6b-2 are controlled individually and independently by the angle changing mechanisms 7b-1 and 7b-2, respectively. That is, in a curve running state, the angle of one of the casters 6b-1 and 6b-2 on an inner side is made larger than the angle of the other on an outer side, to prevent traverse sliding of the casters 6b-1 and 6b-2. Also, when the automobile technology is applied to this carrier, the two angle changing mechanisms 7b-1 and 7b-2 can be driven by a single motor.

Also, mounted on the wheel base 3a is a lifting mechanism 8a for lifting the wheel base 3a, i.e., the casters 6a-1 and 6a-2. Similarly, mounted on the wheel base 3b is a lifting mechanism 8b for lifting the wheel base 3b, i.e., the casters 6b-1 and 6b-2.

Each of the lifting mechanisms, such as 8a, is formed by a pad 81, a guide 82 for guiding the pad 81, a feed screw 83 coupled between the pad 81 and the wheel base 3b, and a motor 84 for driving the feed screw 83. That is, when the pad 81 is pushed down by rotating the feed screw 83, the wheel base 3b is lifted up, i.e., the casters 6b-1 and 6b-2 are lifted up.

Further, provided between the body 1 and the wheel base 3a are fixing mechanisms 9a-1 and 9a-2 for fixing the wheel base 3a to the body 1. Similarly, provided between the body 1 and the wheel base 3b are fixing mechanisms 9b-1 and 9b-2 for fixing the wheel base 3a to the body 1. The fixing mechanisms 9a-1, 9a-2, 9b-1 and 9b-2 prevent the carrier from reeling in a straight running state.

Each of the fixing mechanisms, such as 9a-2, is formed by a dowel pin 91 which can penetrate through holes of the body 1 and the wheel base 3a, and a motor 92 for driving the dowel pin 91. When the dowel pin 91 is removed from the holes of the body 1 and the wheel base 3a, the wheel base 3a is free from the body 1. Contrary to this, when the dowel pin 91 penetrates through the holes of the body 1 and the wheel base 3a, the wheel base 3a is fixed to the body 1.

Figure 4:
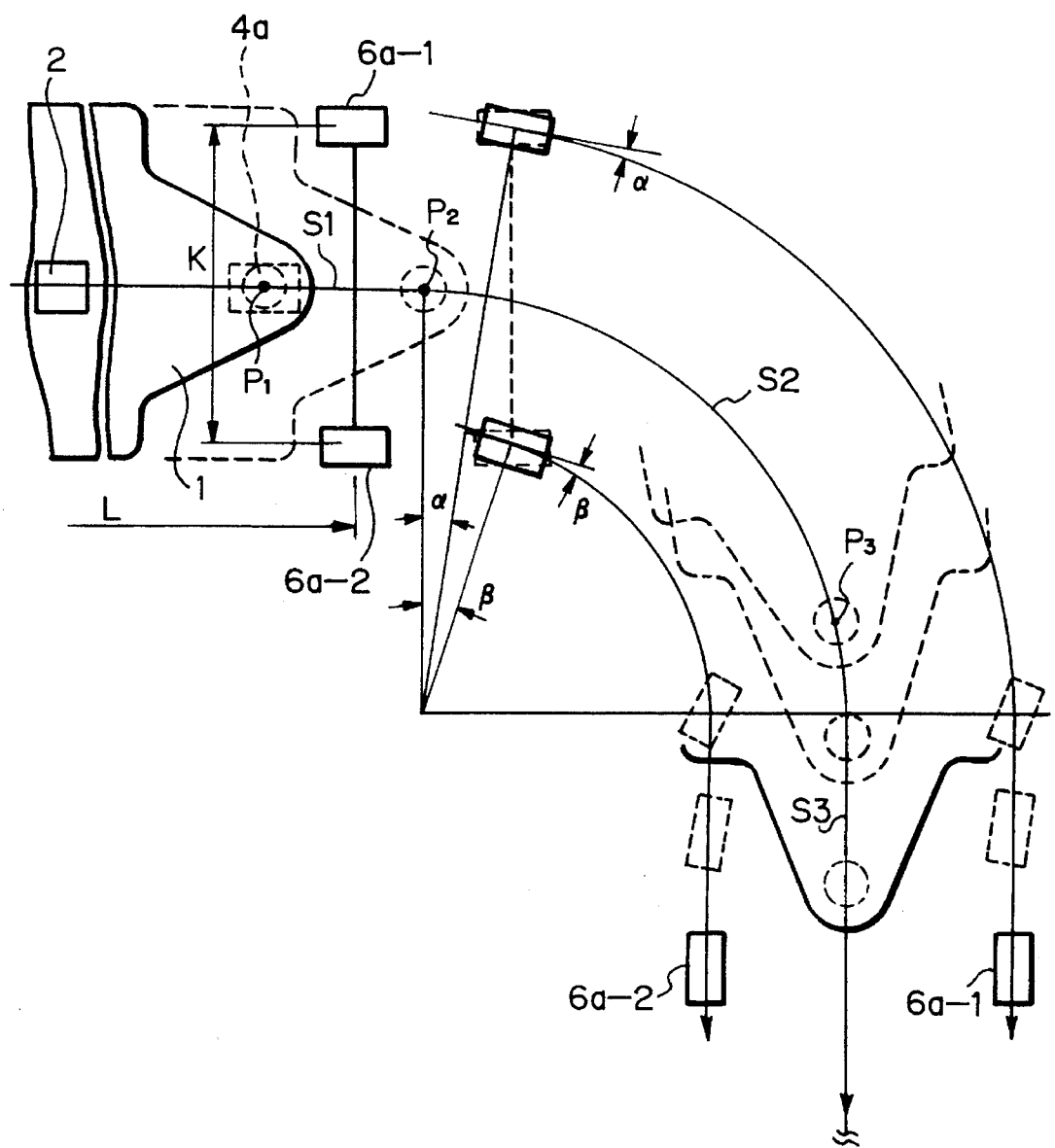
FIG. 4 is a diagram showing a motion locus of the front-side wheel base of FIG. 2.

Referring to FIG. 4, which shows a motion locus of the wheel base 3a on the front side of the carrier, assume that the carrier changes its direction at an angle of 90°. In an initial state, the pivot pin 4a is located at location $P_1$. The carrier proceeds along a straight line S1.

Next, when the pivot pin 4a reaches location $P_2$ for initiating changing of the direction of the casters 6a-1 and 6a-2, the carrier stops. Then, the wheel base 3a, i.e., the casters 6a-1 and 6a-2, is lifted up by the lifting mechanism 8a. After that, the directions of the casters 6a-1 and 6a-2 are changed by the angle changing mechanisms 7a-1 and 7a-2, respectively. In this case, K·L=cot β−cot α where α is the angle of the caster 6a-1;

β is the angle of the caster 6a-2;

K is the distance between the caster 6a-1 and the caster 6a-2; and

L is the distance between the caster 6a-1 (6a-2) and the caster 6b-1 (6b-2). Then, the wheel base 3a, i.e., the casters 6a-1 and 6a-2 are lowered down by the lifting mechanism 8a. Then, the carrier again moves along a curve S2.

Next, when the pivot pin 4a reaches location $P_3$, the angle changing mechanisms 7a-1 and 7a-2 are released by removing their pinions 75 from the ring gears 73. Thus, the casters 6a-1 and 6a-2 automatically become parallel with a straight line S3. After that, the wheel base 3a is fixed to the body 1 by the fixing mechanism 9a, as occasion demands.

Figure 5:
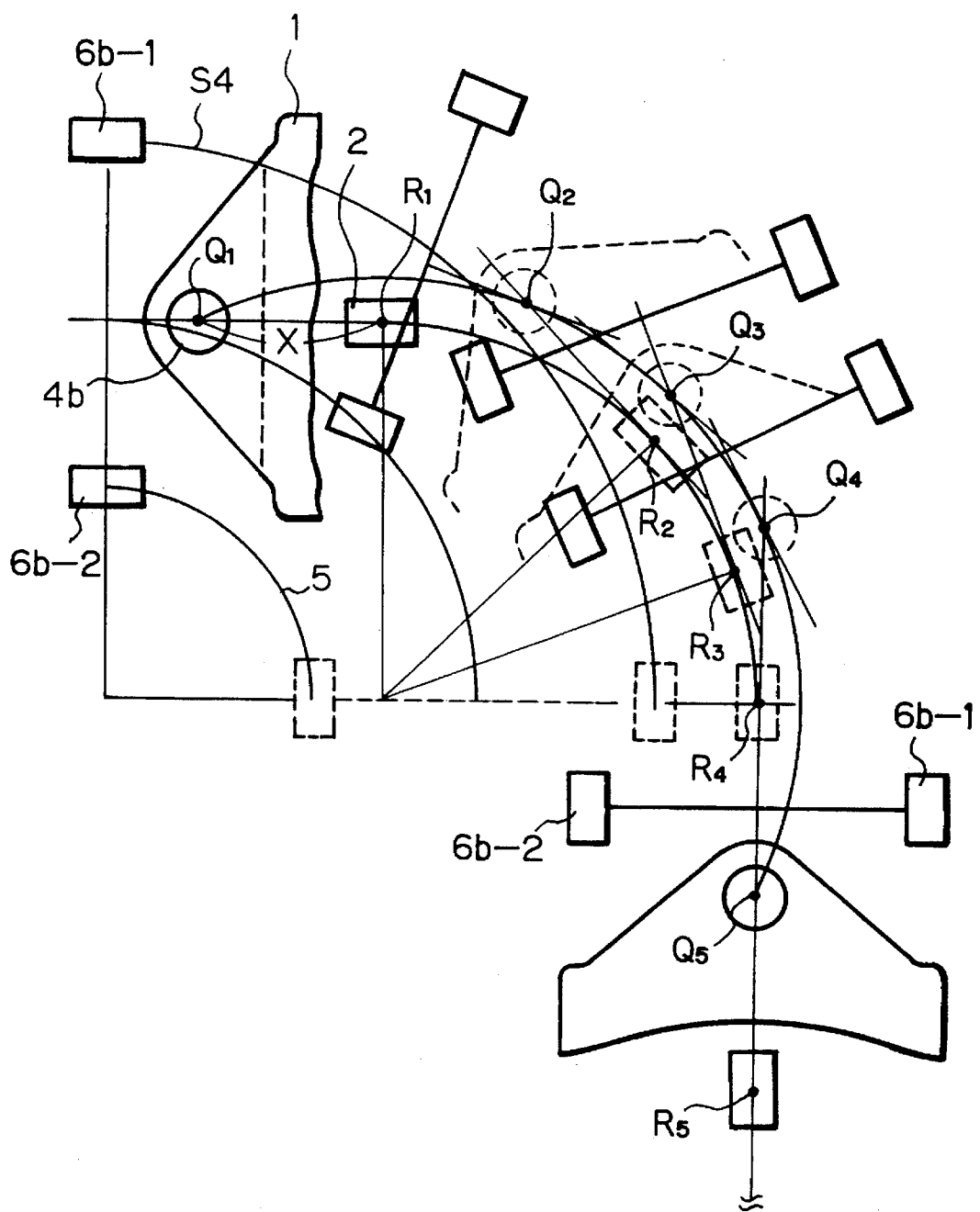
FIG. 5 is a diagram showing a motion locus of the back-side wheel base of FIG. 2.

Referring to FIG. 5, which shows a motion locus of the wheel base 3b on the back side of the carrier, also assume that the carrier turns its direction at an angle of 90°. In an initial state, the pivot pin 4b is located at location $Q_1$, and the driving wheel 2 is located at location $R_1$. In this case, the angle changing mechanisms 7b-1 and 7b-2 are released so that the casters 6b-1 and 6b-2 are in a free state. Also, the fixing mechanisms 9b-1 and 9b-2 are released, so that the wheel base 3b is in a free state.

When the carrier is turned by the casters 6a-1 and 6a-2 on the front side of the body 1, the pivot pin 4b proceeds along a locus defined by $Q_1 \rightarrow Q_2 \rightarrow Q_3 \rightarrow Q_4 \rightarrow Q_5$, while the driving wheel 2 proceeds along a locus defined by $R_1 \rightarrow R_2 \rightarrow R_3 \rightarrow R_4 \rightarrow R_5$. For example, when the pivot pin 4b reaches location $Q_2$, the driving wheel 2 reaches location $R_2$. In this state, the direction of a traction force of the wheel base 3b coincides with a tangent line of the locus $(Q_1 \rightarrow Q_2 \rightarrow Q_3 \rightarrow Q_4 \rightarrow Q_5)$ at location $Q_2$, and the direction of the casters 6b-1 and 6b-2 also coincides with the traction force of the wheel base 3b. Thus, the traverse sliding motion of the casters 6b-1 and 6b-2 can be avoided.

Note that, if the wheel base 3b is fixed to the body 1, or the casters 6b-1 and 6b-2 are fixed to the body 1 as in the prior art, the casters 6b-1 and 6b-2 proceed along locuses S4 and S5, respectively, so that the casters 6b-1 and 6b-2 must slide in the traverse direction.

Also, in the above-mentioned first embodiment, the pivot pin 4a (4b) is away from the driving wheel 2. As a result, as shown in FIG. 5, the locus ($Q_1 \rightarrow Q_2 \rightarrow Q_3 \rightarrow Q_4 \rightarrow Q_5$) of the pivot pin 4b is shifted from the locus ($R_1 R_2 \rightarrow R_3 \rightarrow R_4 \rightarrow R_5$) of the driving wheel 2. In an ideal state, the locations of the pivot pins 4a and 4b should coincide with the location of the driving wheel 2, so that the locuses of motion of the casters 6a-1, 6b-2, 6b-1 and 6b-2 are concentric to the locus of motion of the driving wheel 2 and the locuses of motion of the pivot pins 4a and 4b. That is, the distance X between the pivot pin 4b (4a) and the driving wheel 2 as shown in FIG. 5 is preferably as small as possible.

Figure 6:
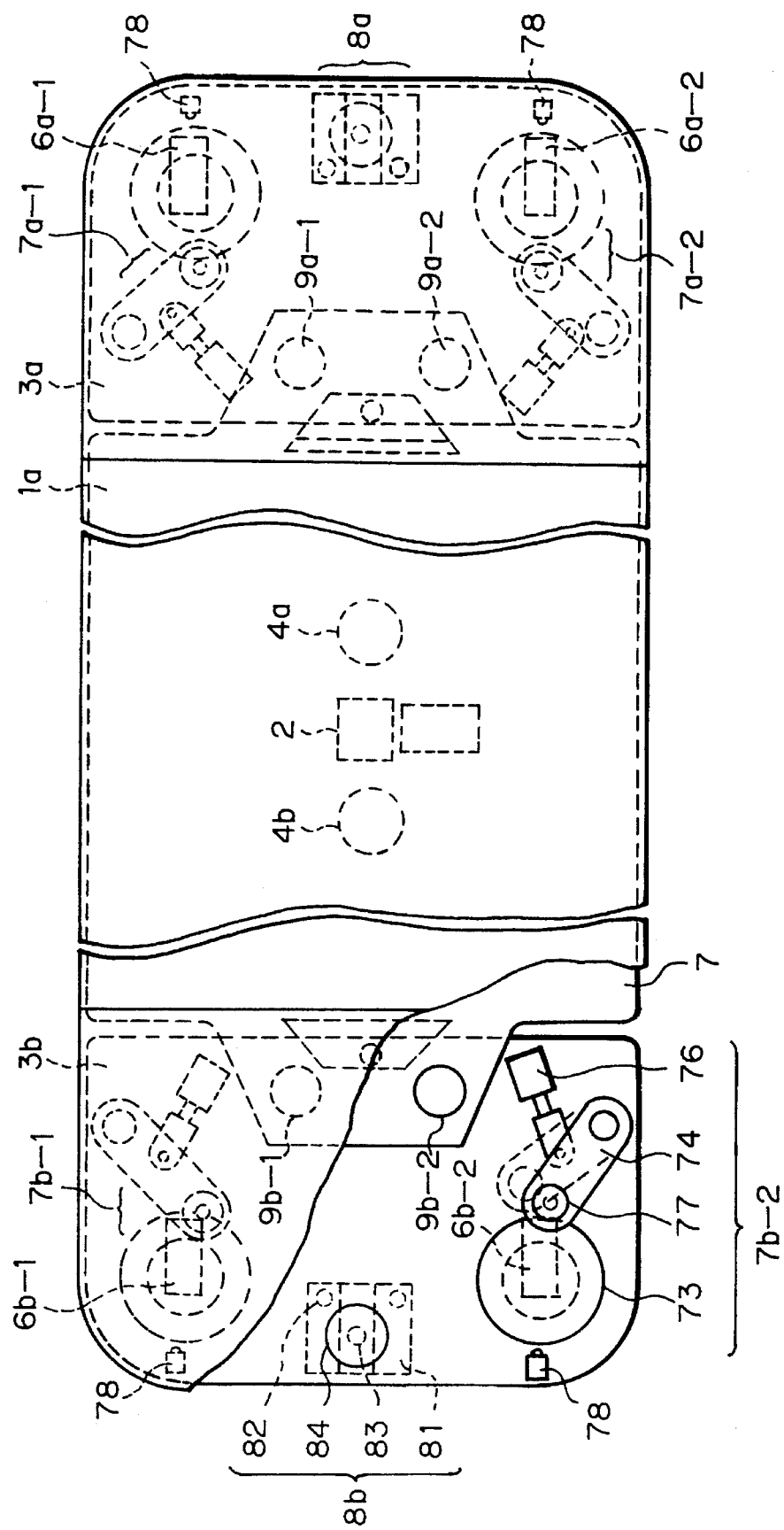
FIG. 6 is a partly-cut plan view illustrating a second embodiment of the automatic carrier according to the present invention.
Figure 7:
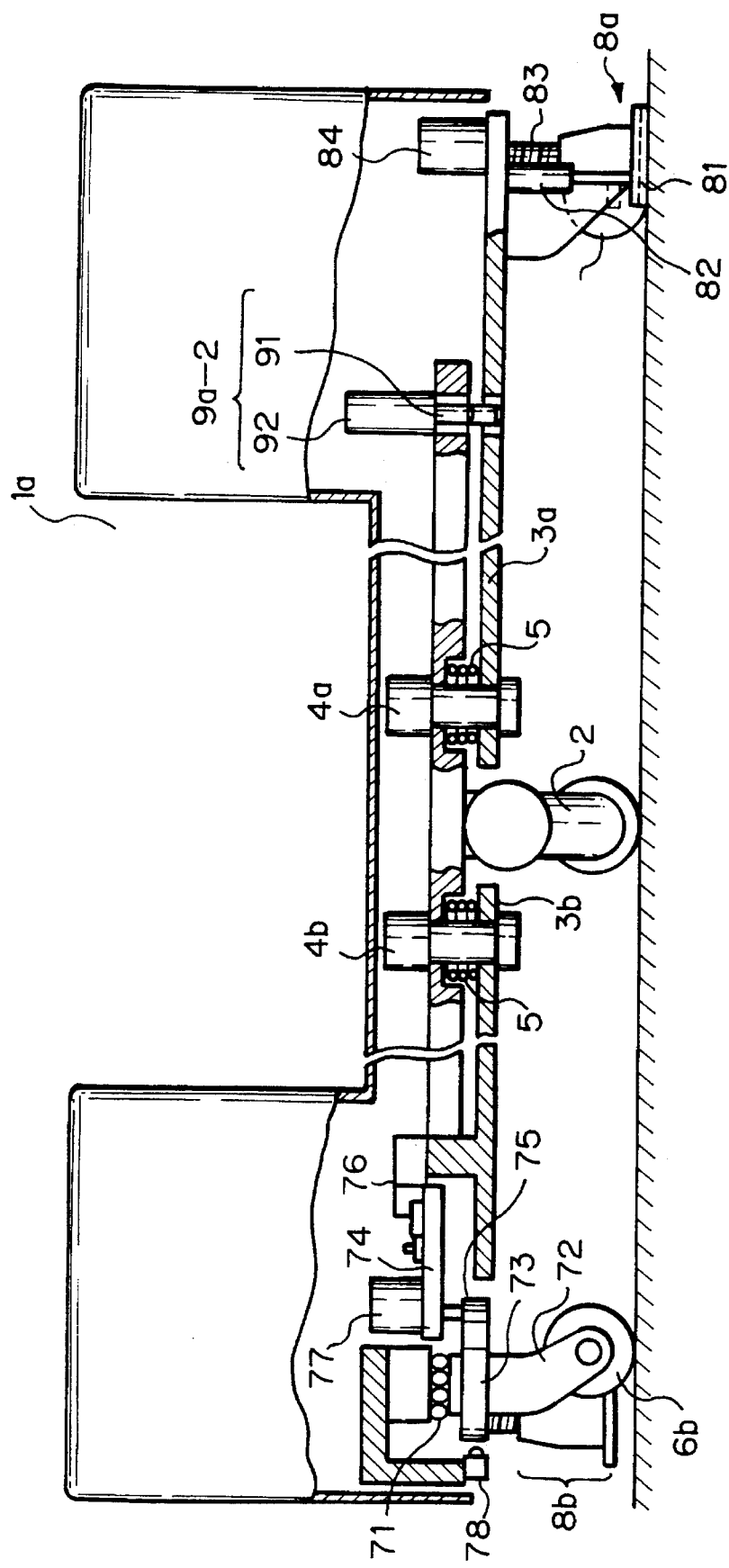
FIG. 7 is a partly-cut side view of the carrier of FIG. 6.

In FIGS. 6 and 7, which illustrate a second embodiment of the present invention, the pivot pins 4a and 4b are in proximity to the driving wheel 2. Therefore, the locuses of motion of the casters 6a-1, 6a-2, 6b-1 and 6b-2, the locus of motion of the pivot pins 4a and 4b, and the locus of motion of the driving wheel 2 are approximately concentric to each other.

As explained hereinbefore, according to the present invention, since lifting mechanisms are provided for lifting the wheel bases, i.e., the driven wheels, the direction of the driven wheels can be easily changed, thus smoothly changing the direction of motion of an automatic carrier.

I claim:

1. An automatic carrier comprising:

a body;

a driving wheel fixed to said body;

a wheel base rotatably mounted on said body;

at least one driven wheel fixed to said wheel base;

changing means for changing a direction of said driven wheel with respect to said wheel base; and lifting means, coupled to said wheel base, for lifting said wheel base whereby the at least one driven wheel is lifted from a supporting surface.

2. An automatic carrier as set forth in claim 1, wherein said lifting means comprises:

a pad;

a feed screw coupled between said pad and said wheel base; and a driving motor, coupled to said feed screw, for rotating said feed screw to lift up and down said pad.

3. An automatic carrier as set forth in claim 1, further comprising a universal pin for rotatably coupling said wheel base to said body.

4. An automatic carrier as set forth in claim 3, wherein said universal pin is in proximity to said driving wheel.

5. An automatic carrier as set forth in claim 3, further comprising a damper in proximity to said pivot pin between said body and said wheel base.

6. An automatic carrier as set forth in claim 1, wherein said changing means comprises:

a pivot coupled between said wheel base and said driven wheel;

a ring gear fixed to said pivot;

an arm having a pinion on an end thereof;

means for moving said arm so that said pinion is in contact with said ring gear; and driving means for driving said pinion.

7. An automatic carrier as set forth in claim 1, further comprising fixing means for fixing said wheel base to said body.

8. An automatic carrier as set forth in claim 7, wherein said fixing means comprises a dowel pin capable of being inserted into holes of said wheel base and said body.

9. An automatic carrier as set forth in claim 1, wherein said driven wheel comprises a caster.

10. An automatic carrier comprising:

a body;

a driving wheel fixed to an approximately center portion of said body;

a first wheel base rotatably mounted on a front side of said body;

a second wheel base rotatably mounted on a back side of said body;

first driven wheels fixed to said first wheel base;

second driven wheels fixed to said second wheel base;

first changing means for changing a direction of said first driven wheels with respect to said first wheel base;

second changing means for changing a direction of said second driven wheels with respect to said second wheel base;

first lifting means, coupled to said first wheel base, for lifting said first wheel base; and second lifting means, coupled to said second wheel base, for lifting said second wheel base.

11. An automatic carrier as set forth in claim 10, wherein each of said first and second lifting means comprises:

a pad;

a feed screw coupled between said pad and one of said first and second wheel bases; and a driving motor, coupled to said feed screw, for rotating said feed screw to lift up and down said pad.

12. An automatic carrier as set forth in claim 10, further comprising:

a first universal pin for rotatably coupling said first wheel base to said body; and a second universal pin for rotatably coupling said second wheel base to said body.

13. An automatic carrier as set forth in claim 12, wherein said first and second universal pins are in proximity to said driving wheel.

14. An automatic carrier as set forth in claim 12, further comprising first and second dampers, each in proximity to one of said first and second pivot pins between said body and one of said first and second wheel bases.

15. An automatic carrier as set forth in claim 10, wherein each of said first and second changing means comprises:

a pivot coupled between one of said first and second wheel bases and said driven wheel;

a ring gear fixed to said pivot;

an arm having a pinion on an end thereof;

means for moving said arm so that said pinion is in contact with said ring gear; and driving means for driving said pinion.

16. An automatic carrier as set forth in claim 10, further comprising first and second fixing means for fixing said first and second wheel bases, respectively, to said body.

17. An automatic carrier as set forth in claim 16, wherein each said first and second fixing means comprises a dowel pin capable of being inserted into holes of one of said first and second wheel bases and said body.

18. An automatic carrier as set forth in claim 10, wherein said first and second driven wheels comprise casters.

* * * * *